(12) United States Patent
Kakadia

(10) Patent No.: US 7,489,690 B2
(45) Date of Patent: Feb. 10, 2009

(54) INTEGRATED PACKET LATENCY AWARE QOS SCHEDULING ALGORITHM USING PROPORTIONAL FAIRNESS AND WEIGHTED FAIR QUEUING FOR WIRELESS INTEGRATED MULTIMEDIA PACKET SERVICES

(75) Inventor: Deepak Kumar Kakadia, Union City, CA (US)

(73) Assignee: Cellco Partnership, Bedminster, NJ (US)

( * ) Notice: Subject to any disclaimer, the term of this patent is extended or adjusted under 35 U.S.C. 154(b) by 345 days.

(21) Appl. No.: 11/274,297

(22) Filed: Nov. 16, 2005

(65) Prior Publication Data

US 2007/0041364 A1 Feb. 22, 2007

Related U.S. Application Data

(60) Provisional application No. 60/707,558, filed on Aug. 12, 2005.

(51) Int. Cl.
H04L 12/28 (2006.01)
(52) U.S. Cl. .............. 370/395.4; 370/229; 370/230; 370/395.41; 370/395.5; 370/413; 709/223; 709/226; 709/227; 709/229; 709/230
(58) Field of Classification Search ............ 370/229, 370/230, 230.1, 232, 237, 351–356, 395.21, 370/395.41, 412, 413–417, 418, 419, 231, 370/238, 254, 255, 395.4, 395.5; 709/217, 709/218, 219, 227–229, 230, 245, 223–226
See application file for complete search history.

(56) References Cited

U.S. PATENT DOCUMENTS 5,463,620 A * 10/1995 Sriram ............... 370/412

| 5,859,835 A * | 1/1999 | Varma et al. ............. 370/229 |
| 6,181,701 B1 * | 1/2001 | Schneeberger ......... 370/395.43 |
| 6,452,933 B1 | 9/2002 | Duffield et al. |
| 6,563,829 B1 * | 5/2003 | Lyles et al. ............. 370/395.21 |
| 6,577,644 B1 | 6/2003 | Chuah et al. |
| 6,647,017 B1 * | 11/2003 | Heiman ................... 370/412 |
| 6,728,365 B1 | 4/2004 | Li et al. |

(Continued)

OTHER PUBLICATIONS

Jorg Liebeherr, Dallas E. Wrege, Priority Queue Schedulers with Approximate Sorting in Output-Buffered Switches, Jun. 1999, IEEE Journal on Selected Areas in Communications, vol. 17, No. 6, pp. 1127-1144.*

(Continued)

*Primary Examiner*—Charles N Appiah
*Assistant Examiner*—Olumide T Ajibade Akonai
(74) *Attorney, Agent, or Firm*—McDermott Will & Emery LLP

(57) ABSTRACT

Packet communication networks for transmission to wireless subscriber devices utilize both wireline and wireless packet routing components. The routing elements of these two different types often implement different packet scheduling algorithms, typically a form of Weighted Fair Queuing (WFQ) in the wireline portion of the network and Proportional Fairness (PF) queuing in the wireless domain. To improve resource allocation and thus end to end quality of service for time sensitive communications, such as integrated multimedia services, the present disclosure suggests adding the notion of slack time into either one or both of the packet scheduling algorithms. By modifying one or more of these algorithms, e.g. to reorder or shuffle packets based on slack times, global optimal resource allocations are possible, at least in certain cases.

18 Claims, 9 Drawing Sheets

U.S. PATENT DOCUMENTS

| | | | |
|---|---|---|---|
| 6,738,386 B1* | 5/2004 | Holmqvist | 370/412 |
| 6,765,909 B1 | 7/2004 | Sen et al. | |
| 6,882,625 B2* | 4/2005 | Le et al. | 370/238 |
| 6,891,834 B1* | 5/2005 | Dally et al. | 370/395.4 |
| 6,925,057 B2 | 8/2005 | Cheng et al. | |
| 6,940,836 B2 | 9/2005 | Borella et al. | |
| 6,980,523 B1 | 12/2005 | Lipford et al. | |
| 7,190,674 B2* | 3/2007 | Kobayakawa et al. | 370/235 |
| 7,263,065 B1* | 8/2007 | Cahn | 370/235 |
| 7,362,706 B2* | 4/2008 | Grosbach et al. | 370/230.1 |
| 2001/0051992 A1* | 12/2001 | Yang et al. | 709/207 |
| 2003/0055920 A1 | 3/2003 | Kakadia et al. | |
| 2003/0133406 A1* | 7/2003 | Fawaz et al. | 370/229 |
| 2003/0198220 A1* | 10/2003 | Gross et al. | 370/389 |
| 2003/0223430 A1* | 12/2003 | Lodha et al. | 370/395.41 |
| 2004/0066746 A1 | 4/2004 | Matsunaga | |
| 2004/0082364 A1 | 4/2004 | Kitazawa et al. | |
| 2005/0094675 A1 | 5/2005 | Bhushan et al. | |
| 2005/0281279 A1* | 12/2005 | Dennison et al. | 370/412 |
| 2007/0002740 A1* | 1/2007 | Evans et al. | 370/230.1 |

OTHER PUBLICATIONS

Jin Yang, "Performance and Deployment of a Mobile Broadband Wireless Network Based on IS-856 (1xEV-DO)," Verizon Wireless, USA.

Cèdric Westphal, "Monitoring Proportional Fairness in cdma2000 © High Data Rate Networks," IEEE Globecom, 2004, pp. 1-6.

Abhay K. Parekh, et al., "A Generalized Processor Sharing Approach to Flow Control in Integrated Services Networks: The Single Node Case," IEEE/ACM Transactions on Networking, Jun. 1993, pp. 344-357, vol. 1., No. 3.

Young-June Choi, et al., "Scheduling for VoIP Service in cdma2000 1x EV-DO," IEEE, 2004, IEEE Communications Society.

Mooi Choo Chuah, et al., "Quality of Service in Third-Generation IP-Based Radio Access Networks," Bell Labs Technical Journal, 2002, pp. 67-89, vol. 7, No. 2, Lucent Technologies Co., Wiley Periodicals, Inc.

Patrick Svedman, et al., "A Qos-aware Proportional Fair Scheduler for Opportunistic OFDM," IEEE, Jul. 5, 2004.

PCT/US06/23872, Mar. 5, 2008 International Search Report and Written Opinion.

* cited by examiner

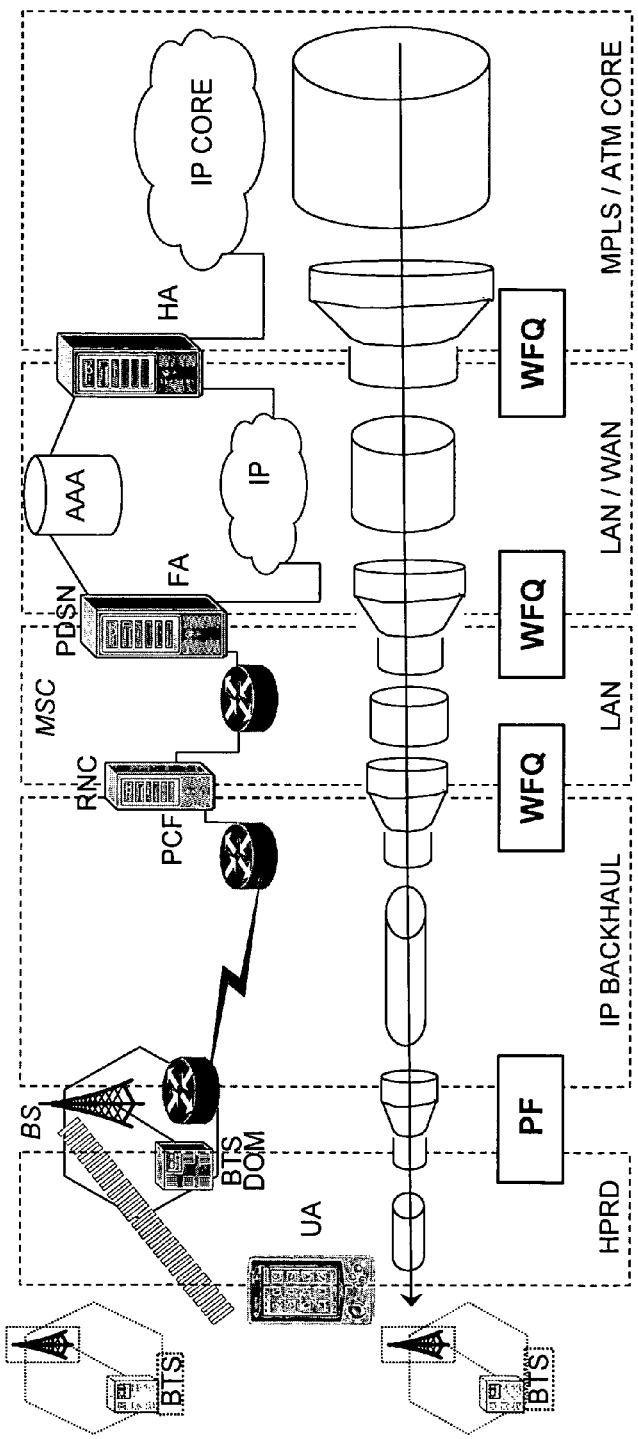
FIG. 1 - Prior Art

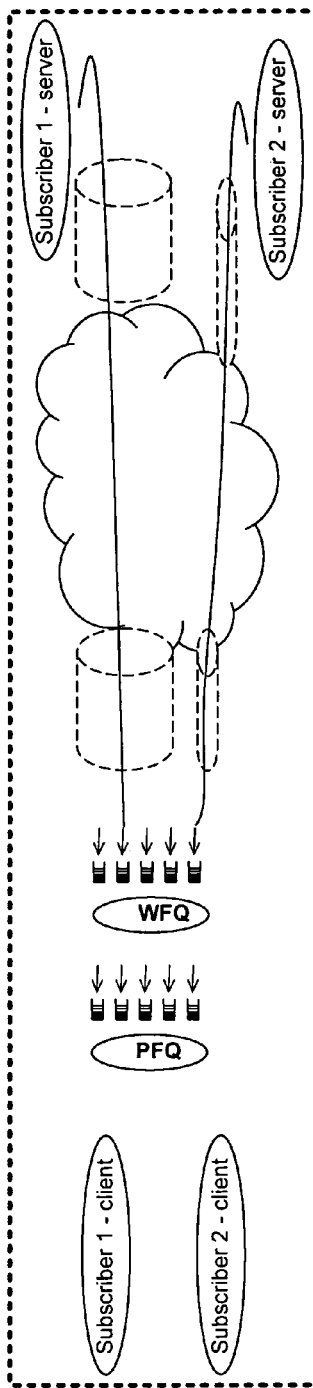
FIG. 2A - Prior Art
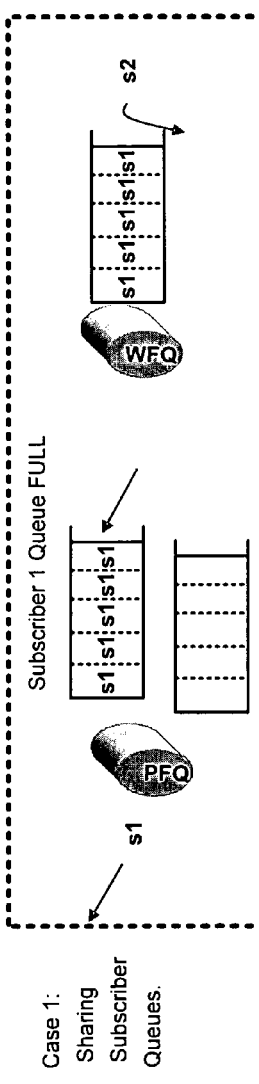
FIG. 2B - Prior Art
Case 1:
Sharing
Subscriber
Queues.
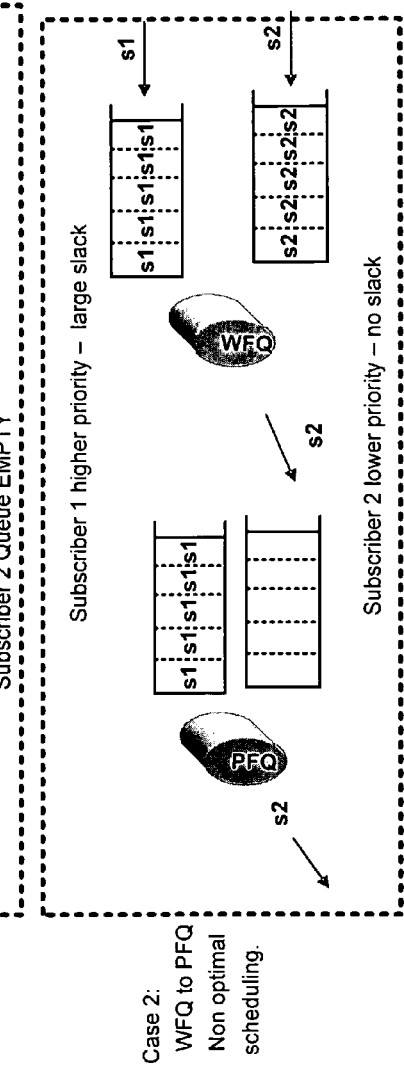
FIG. 2C - Prior Art
Case 2:
WFQ to PFQ
Non optimal
scheduling.

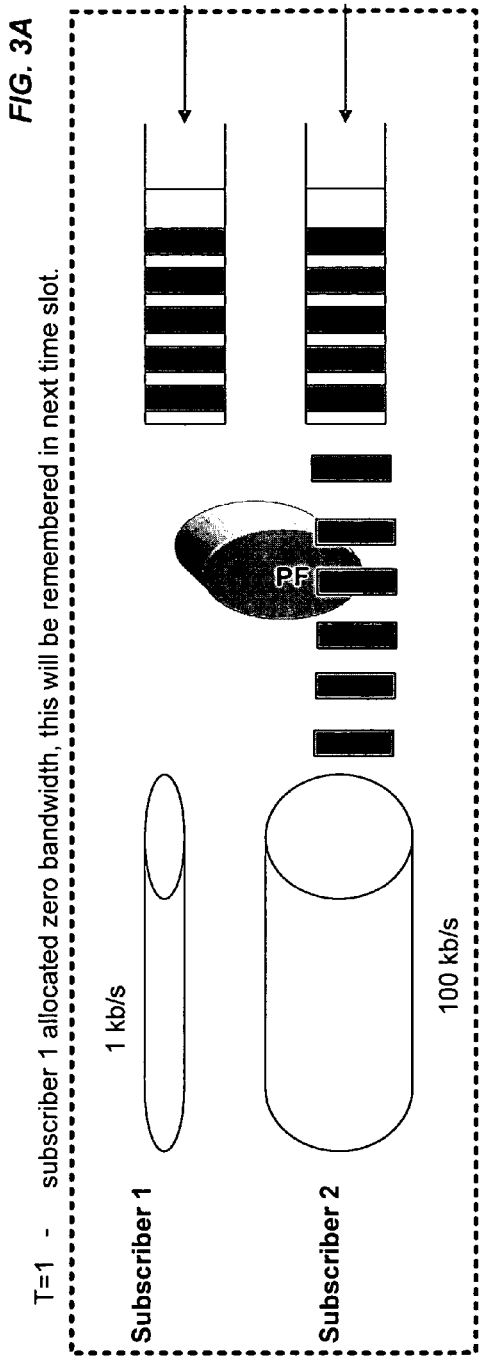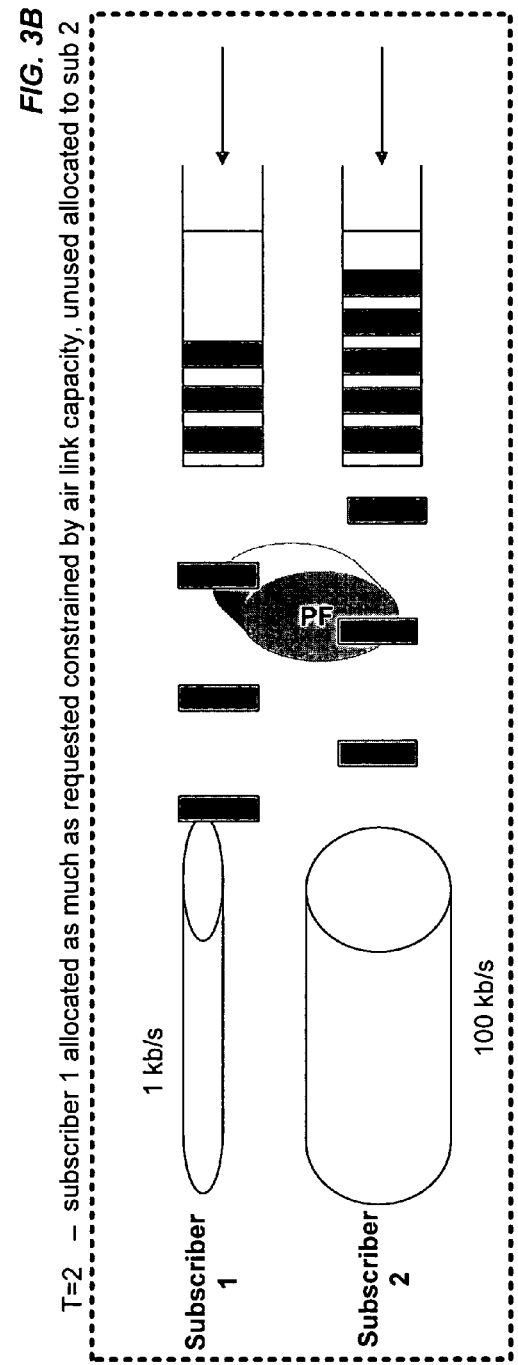

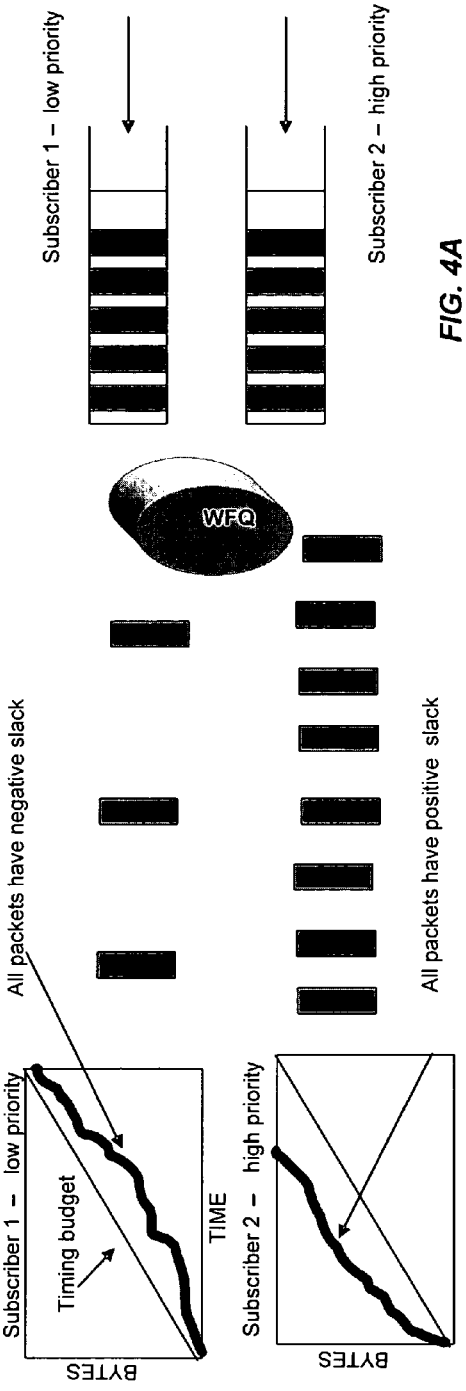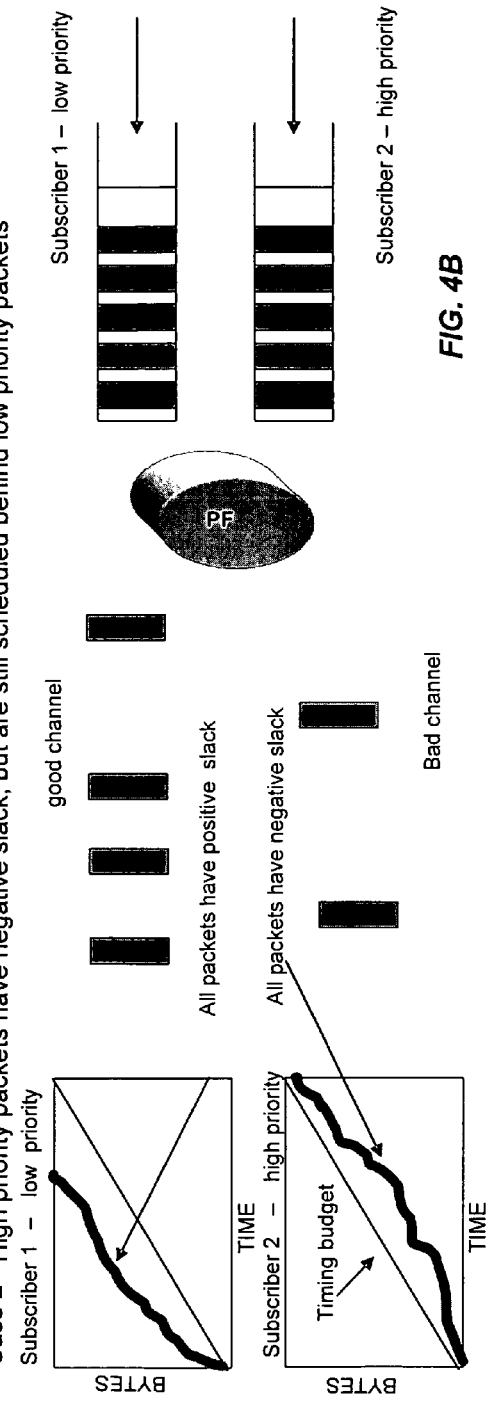
FIG. 4A
FIG. 4B

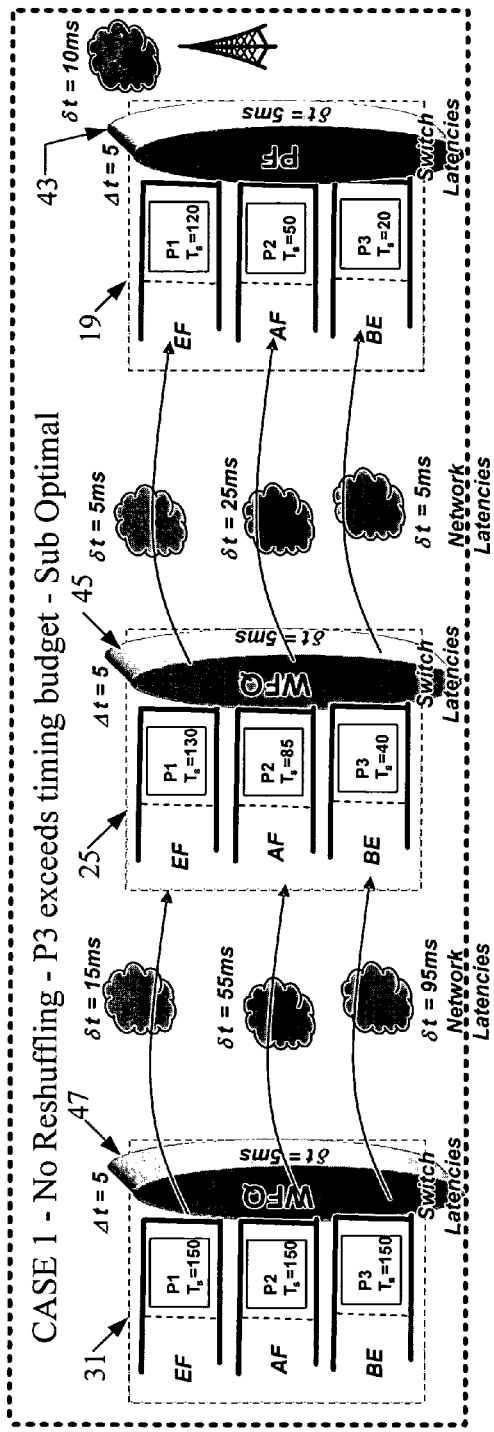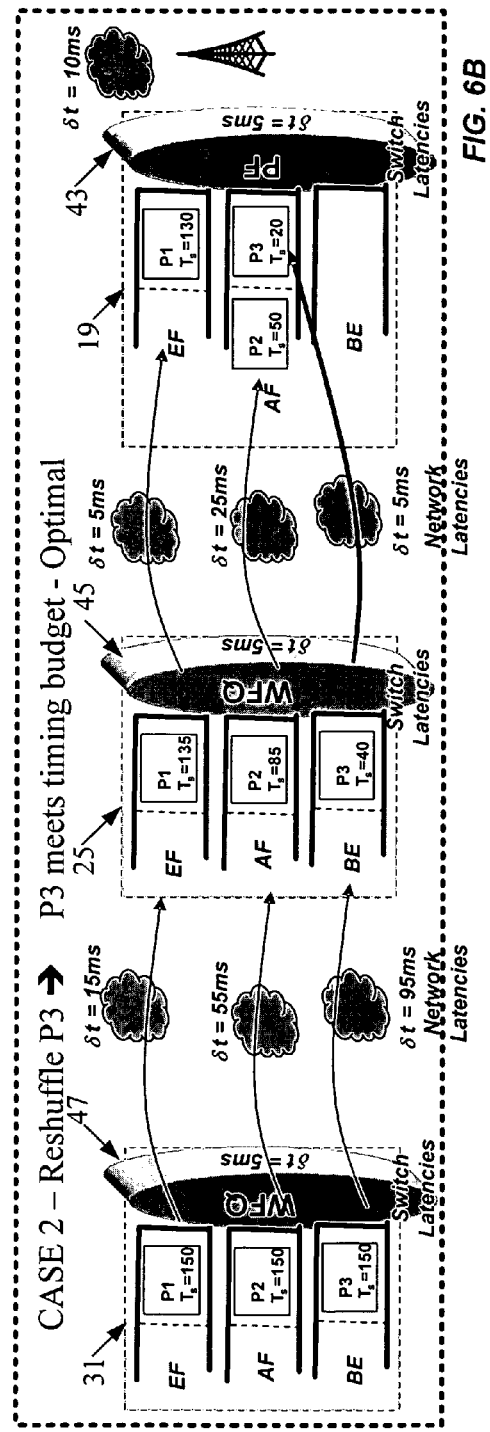
FIG. 6A
FIG. 6B

INTEGRATED PACKET LATENCY AWARE QOS SCHEDULING ALGORITHM USING PROPORTIONAL FAIRNESS AND WEIGHTED FAIR QUEUING FOR WIRELESS INTEGRATED MULTIMEDIA PACKET SERVICES

RELATED APPLICATIONS

This application claims the benefit of U.S. Provisional Application No. 60/707,558 Filed Aug. 12, 2005 entitled "INTEGRATED PACKET LATENCY AWARE QOS SCHEDULING ALGORITHM USING PROPORTIONAL FAIRNESS AND WEIGHTED FAIR QUEUING FOR IMS SERVICES IN 3G CDMA2000 1XEV-DO AND IP NETWORKS," the disclosure of which also is entirely incorporated herein by reference.

TECHNICAL FIELD

The present subject matter relates to techniques and equipment to improve resource allocation and thus quality of service for time sensitive communications, such as integrated multimedia services, through combinations of wireless and packet networks that implement multiple scheduling algorithms.

BACKGROUND

Integrated Multimedia Services (IMS) are being deployed in 3G cdma2000 type public wireless networks connected to Internet Protocol (IP) networks. However, the wireless and IP networks utilize certain incongruent quality of service (QoS) scheduling strategies, which results in sub optimal prioritized packet scheduling decisions. For example, on the downlink scheduling of packets in cdma2000 1xEV-DO cellular networks, there is a clear misalignment due to the two distinct QoS domains of the wireless and wireline IP networks. The public wireless cellular networks typically use QoS algorithms based on Proportional Fairness (PF). PF is concerned with deciding which packet to transmit in a particular time slot on a single shared broadband channel, based on fair allocation of bandwidth and maximizing system throughput. In contrast, the IP networks forming the Internet and various wireline Intranets typically use QoS algorithms based on Generalized Processor Sharing (GPS), in particular Weighted Fair Queuing (WFQ), which decides which packet to transmit in a particular time slot out to an egress port based on fair allocation of bandwidth and minimizing average flow delay for well behaved or policed traffic. Blindly integrating these two networks, with their associated scheduling mechanisms, may result in sub optimal resource allocations leading to excessive and unnecessary delays for certain users.

FIG. 1 depicts a typical implementation of a 3GPP2 1xEV-DO network. The drawing shows network elements in high-level functional block diagram form, and it shows certain aspects of the processing involved in communications through the illustrated elements. The mobile device, sometimes referred to as a mobile User Agent (UA), communicates through a Base Transmitter Station (BTS), selected from among those that the mobile device can detect (approximately within range) over the air, ending up with the BTS with the best Channel to Interference ratio. The High Rate Packet Data Interface (HPRD) on this wireless network segment or domain is the most expensive and narrow capacity network connection amongst all segments (represented thematically by the pipes of various sizes/bandwidths) that will carry the UA's communication. The packet scheduler on this segment may reside in a DOM module (Data Optimized Module) as one example of an implementation. The DOM, typically in the form of a card that fits in a Base Transmitter Station (BTS), communicates with the UA mobile device over the air link using a specific frequency spectrum. The scheduler in the DOM optimizes system throughput based on a proportional fairness algorithm (PF), represented by the functional block in the diagram.

The next segment connects the BTS to the Radio Network Controller (RNC), located in the Mobile Switching Center (MSC). This wireline segment traditionally utilized, TDMA based T1 circuits, but the segment is now evolving to utilize Metro Ethernet connections provided by Regional Service providers. These links are typically 10/100 Mbs capacity. The metro Ethernet connection on the MSC side is typically on the order of a gigabit link capacity. The wireline packet scheduler in the RNC, on the forward link typically uses a variant of Weighted Fair Queuing (WFQ), represented by the functional block in the diagram. Least latency queuing (LLQ) is often implemented since it combines a strict priority queue with WFQ to support real time traffic. The rest of the wireline network segments all use some form of WFQ packet scheduler, as shown by the WFQ scheduler blocks in the diagram. WFQ is designed to minimize average latency for all flows. Although shown separately for illustration purposes, the PF and WFQ scheduler functions typically are functional aspects of the relevant routing elements, such as those in or associated with the DOM and RNC.

The wireline network segment between the IP backhaul and HPRD, on the forward link (arrow representing traffic communication from the IP core network going to mobile station UA), has a clear misalignment of optimizations. This segment extends out to and includes a portion of the Data Optimized Module (DOM), at the BTS. The DOM implements a special algorithm to transmit/(receive) data to/(from) the mobile devices via the wireless network domain, including the air link(s) to and from the UA mobile devices. DOM has been developed to implement 1xEV-DO type wireless packet communication service—a type of CDMA protocol for high speed packet data transmission for mobile networks. The wireless PF type packet scheduler implemented in the DOM module tries to maximize system throughput, whereas the WFQ type wireline packet schedulers used for forwarding of packets to the DOM minimize average latency.

The core portion of the network may be implemented in a variety of different ways, which will provide adequate transport capability for the IP packet traffic. For purposes of showing a complete example, the core is shown using is Multi Protocol Label Switching (MPLS) fast efficient forwarding of packets over asynchronous transfer mode (ATM) cell type transport. The lower portion of the drawing shows the protocol stacks for an exemplary implementation of the illustrated network. Those skilled in the art will recognize that various networks may utilize these or other combinations of communications protocols.

FIGS. 2A to 2C depict in more detail, exemplary problems that may arise when connecting a wireline network to a wireless network. FIG. 2A shows the general case where two equal priority subscribers experience different congestion and different amounts of traffic on the forward links. Packets bound for each subscriber are placed in queue at a router in the wireline part of the network, which implements WFQ scheduling. The router selects packets from the various queues and passes the packets, as scheduled, to the wireless portion of the network. In the wireless portion of the network, packets are placed in queue by an element such as the DOM, which utilizes the PF scheduling algorithm. The BTS transmits packets from the queues, as scheduled by application of the PF algorithm, over the air link to the mobile station client devices of the respective subscribers.

In the example, the subscriber 1 client device has a remote connection to a server over a very uncongested link, and hence is receiving a large burst of traffic (represented by the wide dotted line pipes in FIG. 2A). The subscriber 2 client device, on the other hand, has a remote server connection over a very congested link (represented by the narrow dotted line pipes in FIG. 2A) and is receiving a very small amount of packet traffic. Two problems arise in this case.

FIGS. 2B and 2C show the relevant queues at the respective routers, which will handle the packets for the two subscribers as they pass out of the wireline domain and through the wireless network to the client devices.

As shown in FIG. 2B, since they are of the same priority, if the wireline network device is using class based queuing, not per flow queues implemented in the WFQ scheduling, the WFQ scheduler just places any new data for subscriber 2 in the one outbound queue behind any data already scheduled for transmission to subscriber 1. Since there is much more data for subscriber 1, there will often be a substantial number of packets ahead of any packets for subscriber 2 at the time of WFQ scheduling.

Since the wireline network is usually over-provisioned, it is easy to see that in the wireless domain element, the subscriber 1 will have many more packets in its queue than subscriber 2 (subscriber 1 has a full queue, while that for subscriber 2 is empty in the example). The subscriber 1 transmissions are able to fill up the queue of subscriber 1 at a relatively higher rate than subscriber 2 because of the routing and scheduling through the wireline part of the network.

The PF algorithm used by the scheduler for the wireless link will basically give a higher preference to a particular subscriber based on the amount of packets in the queue for that subscriber and/or the amount of bandwidth the air link can handle between a particular mobile subscriber device and the Access Network. In the example, the PF scheduler continually gives higher priority to subscriber 1, because that subscriber has more packets in its queue. Hence, it is very easy for subscriber 1 to hog all the bandwidth, and virtually starve out subscriber 2. The condition can be particularly problematic, if the radio conditions are equal, and subscriber 1 is of lower priority. The PF scheduler will unfairly give a higher number of time slots to subscriber 1, even though the two subscribers are of the same priority.

The second problem is shown in FIG. 2C. Now, there are per flow queues implemented in the wireline element performing the WFQ scheduling. In the example, assume subscriber 1 traffic has the higher priority. WFQ schedules traffic at least in significant part based on priority, therefore whenever the element performing the WFQ scheduling has packets to send for both subscribers, it will forward those for subscriber 1 first, based on the higher priority of that subscriber's traffic. Even though subscriber 1 is given higher priority in transmission, packets for subscriber 1 will keep the queue for that subscriber relatively full, because of the number of packets supplied through its broadband session from the server (see also FIG. 2A).

Due to differences in network congestion, the lower priority traffic is delayed significantly on the wireline network. This wireline network delay may reach a point at which the lower priority traffic will be dropped if it is not sent immediately to the subscriber 2 client device. However, because the WFQ scheduling gives priority to subscriber 1 and subscriber 1 has a relatively full queue, the wireline router still sends packets for subscriber 1 before transmitting packets for subscriber 2. This tends to keep packets for subscriber 1 in the queue in wireless domain, so that the PF scheduler continually gives higher priority to subscriber 1. In the example, the queue that contains subscriber 1 packets, at the wireless routing element using PF scheduling, is relatively full. At the same time, the queue for subscriber 2 at that element contains few, if any, data packets. As a result, subscriber 1 traffic is given priority and is transmitted to the client device significantly below the time delay budget. Here we clearly see that the WFQ scheduling is concerned with minimizing local average delay of the flows in each queue and that the PF algorithm is concerned with maximizing system throughput on the air link. What is missing is something that also considers the global goal of meeting time budgets of all flows but ensuring higher priority traffic is not delayed beyond a noticeable amount to subscribers.

Another obvious problem occurs when the PF function in the wireless network schedules packets based on channel condition. If the PF algorithm does not consider the notion of priority of the queue, then it can be clearly seen that low priority users, with consistently good channel conditions will be allocated more network resources and be given preferential treatment over higher priority subscribers.

As shown by the discussion above, a problem exists with End to End QoS Packet scheduling parameters, when deploying time sensitive network traffic onto combinations of 3G cdma2000 1xEV-DO networks and IP networks. The packet scheduling algorithms were not designed for hybrid deployments from wireless to wireline packet sessions, resulting in sub optimal resource allocations. A need exists to improve scheduling algorithms for time sensitive services, such as integrated multimedia services, through combinations of wireless and wireline packet (e.g. IP) networks that avoid resource allocation problems and/or improve performance.

SUMMARY

The teachings herein propose a solution, examples of which include adding the notion of slack time into the packet scheduling algorithm(s) for Weighted Fair Queuing and/or Proportional Fairness Queuing, in hybrid wireline-wireless network deployments. By modifying one or more of these algorithms, e.g. to reorder or shuffle packets based on slack times, global optimal resource allocations are possible, at least in certain cases.

For example, the disclosure herein describes a method of scheduling packet transmissions, for use in providing packet communication service to wireless subscriber client devices through a hybrid network having a wireline portion and a wireless portion. This method involves determining a time budget for delivery of each respective packet through the combination of the wireline and wireless portions of the network to each of a number of the wireless subscriber client devices. The packets are routed through the wireline portion of the network to the wireless portion of the network, using a first scheduling algorithm. Based on transit of each respective packet through the wireline portion of the network, an element computes a slack time, which represents the remaining amount of the time budget for delivery of the respective packet. The method also involves routing the packets through the wireless portion of the network using a second scheduling algorithm different from the first scheduling algorithm. At a point in the wireline network or a point in the wireless network, before transmission of packets over wireless link to respective wireless subscriber client devices, at least two of the packets intended for different wireless subscriber client devices are reordered, based on the computed slack times for those packets. The reordered packets are routed in accord with at least one of the scheduling algorithms. The reordering and subsequent scheduling of routing insures that the packets can be delivered to the appropriate wireless subscriber client devices before expiration of respective timing budgets.

In a typical hybrid implementation, the wireline portion of the network uses a Weighted Fair Queuing (WFQ) algorithm for scheduling packet transmissions from each network routing element or a combination of WFQ with another algorithm, such as strict priority. The wireless portion of the network uses a Proportional Fairness (PF) algorithm for scheduling packet transmissions over the wireless link(s) to the client devices. The slack time monitoring and reordering of packets can be done in either or both portions of the network, that is to say with respect to WFQ scheduling and/or PF scheduling.

In an exemplary implementation, a monitor detects entry of each packet into the network and generates a time stamp indicating that entry time. The slack time for the packet, upon arrival at a downstream node, equals the difference between time of arrival at the downstream node and time of entry for the respective packet, subtracted from the time budget for the respective packet.

The network will typically provide a number of different communication services in support of different applications, which will have different tolerances for network latency. The network may implement different time budgets for packet delivery with regard to subscriber packets relating to those different applications or carried via the different network services. In such a case, the determination of the budget for each packet involves detecting the application or service for each packet (e.g. based on a respective traffic flow), from among the services or applications supported through the network. Based on the service or application, a time budget is assigned from among the possible time budgets associated with the various different services or applications supported through the network.

The methodology may be implemented in a variety of different types of networks utilizing wireline and wireless network components to communicate packets to wireless client devices. The example shown in the drawings and discussed in detail utilizes a hybrid implementation of a 3GPP2 1xEV-DO network. Packet communications through such a network support voice telephony using VoIP, web surfing, software and/or video downloading, various e-mail and text messaging services, and a variety of other applications/services.

Aspects of the enhanced packet routing technology may be embodied in a communication network or in a packet handling system for use in a network.

A network, for example, might provide wireless service for wireless subscriber client devices. Such a network would include a wireline portion and a wireless portion. The wireline network portion includes one or more packet routing elements. The packet routing element has an associated first packet transmission scheduler function, which utilizes a first scheduling algorithm. The wireless portion receives packets from the wireline portion and transmits the received packets over one or more air links to the wireless subscriber client devices. The wireless portion includes at least one packet transmission element having an associated second packet scheduler function. The second scheduler function utilizes a second scheduling algorithm different from the first scheduling algorithm. The network also includes a packet monitor, which monitoring flows of packets through the network, to determine a remaining slack time for delivery of each packet. The monitor also instructs at least one the schedulers to reorder packets, so as to avoid an expiration of the slack time for delivery of one or more of the reordered packets.

The packet handling system controls packet communications through a network providing wireless service for wireless subscriber client devices. This system includes a packet scheduler and a packet monitor. The packet scheduler controls scheduling of transmissions of packets, intended for different wireless subscriber client devices, through a network hop toward a wireless network link serving the client devices. The packet monitor monitors packet traffic to determine a remaining slack time for delivery of each packet. The monitor instructs the packet scheduler to schedule a first packet, which has a remaining slack time too small to allow delivery to a first wireless subscriber client device, before expiration of the remaining slack time for the first packet, but ahead of a second packet that has sufficient remaining slack time to allow delivery to a second wireless subscriber client device after transmission of the first packet.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 depicts a 3GPP2 1xEV-DO network architecture, link capacities, protocols and packet schedulers for QoS.

FIGS. 2A-2C show how non-aligned packet scheduler goals result in sub optimal utilization of resources.

FIGS. 3A and 3B illustrate how a proportional fairness (PF) algorithm considers channel condition and the amount of bandwidth requested, to maximize system throughput.

FIGS. 4A and 4B illustrate sub optimal scheduling decisions, based on local weighted fair queuing (WFQ) and proportional fairness (PF) scheduling policies.

FIGS. 6A and 6B show the benefit of reshuffling a packet scheduling algorithm, resulting in optimal network resource allocations.

DETAILED DESCRIPTION

Figure 5:
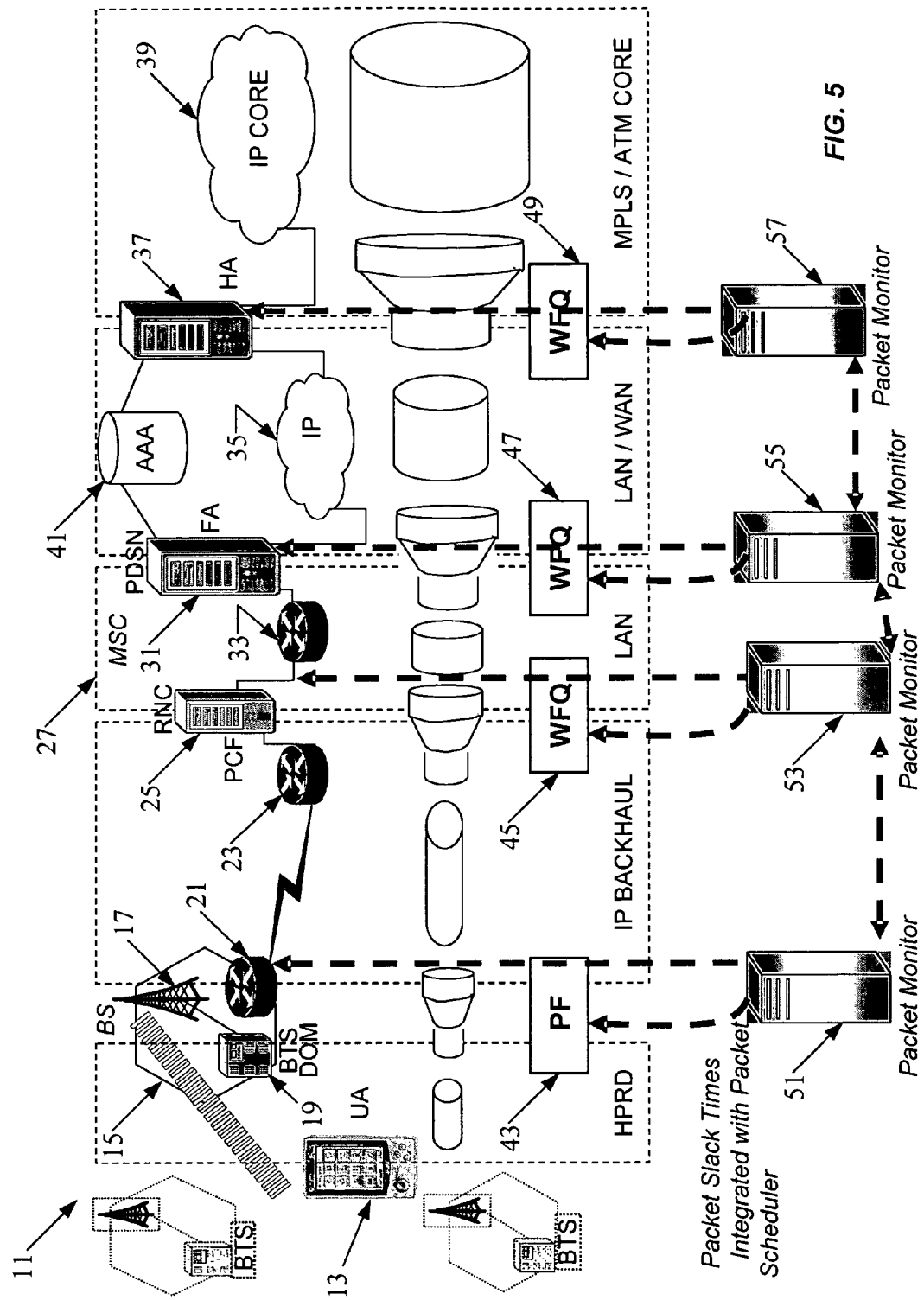
FIG. 5 depicts a wireless and wireline network architecture, having a distributed integrated packet latency monitor and a packet scheduling mechanism that can adjust for slack times.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The solution in the examples discussed herein provides an integrated packet latency aware scheduling algorithm, for network deployments using combinations of Proportional Fairness and Weighted Fair Queuing scheduling for packets destined for wireless client devices. Reference now is made in detail to the examples illustrated in the accompanying drawings and discussed below.

Initially, we present a formal analysis that in order to support real time data on 3GPP2 1xEV-DO networks, and allocate resource in the optimization of meeting all time latency budgets, such as for VoIP traffic, the notion of time slack should be considered at the edge of the network between the wireless and wireline network, which is usually at the BTS and/or RNC schedulers.

As noted above, the radio network uses a PF scheduling strategy. The proportional fairness (PF) algorithm attempts to maximize system throughput with the added constraint of avoiding starvation of any of the flows. The PF algorithm assigns radio resources to a queue of data packets, intended for transmission to a mobile device, having the maximum ratio between the flow rate or bandwidth requested for a next pending data transfer and the actual value of the flow rate or bandwidth for data transfer to the mobile devise in the previous time slot. The PF algorithm is denoted as follows:

$$PF = \arg_{max}(ri/Ri) \, j \in \{1, \ldots N\}$$

where $r_i$ is the flow rate or bandwidth requested at the current time slot, and $R_i$ was the actual bandwidth or flow rate that traversed the airlink in the previous time slot.

The network element controlling packet transmissions queues-up packets for each mobile device. Then, the element assigns radio resources to the queues of data packets for the mobile devices, based on the relative values given by the PF algorithm. Specifically, the queue for the device having the maximum value produced by the algorithm is given resources to allow transmission of a packet from the queue, the queue for the device with the next highest value is given resources to allow transmission, and so on.

It can be easily seen that this prevents starvation since if the previous time window allocated zero bandwidth $R_i=0$, and there is an outstanding positive non zero requested bandwidth in current time window $r_i>0$, the ratio $r_i/R_i$ results in a very large number, ensuring allocation of bandwidth by the scheduler to this subscriber. This feature of the PF scheduling algorithm results in a self adaptive property, where flows that are starting to starve, gradually gain more weight in subsequent time slots.

We further illustrate this with an example. FIGS. 3A and 3B illustrate the main idea behind the proportional fairness algorithm. In these drawings, the queues for the subscriber data packets are shown to the right of the PF scheduler. The cylindrical pipes schematically depict the relative bandwidth provided over the air link to the respective wireless client devices. The drawings represent the PF scheduled traffic through two successive time slots, T=1 (FIG. 3A) and T=2 (FIG. 3B).

In the first time slot T=1 (FIG. 3A), we see that the first subscriber has a channel condition that can handle 1 kbs, while the second subscriber has a channel condition that can absorb 100 kbs. In the example, both are receiving streams from the wireline network at the same rate of 100 kbs. Suppose in the worst case, subscriber 1 was not given any bandwidth in the first time slot, hence $R_1=0$, and $R_2=100$. Let $r_1=1$ and $r_2=100$. The queue of subscriber 1 will obviously start to fill up. Now, in the second time slot T=2 (FIG. 3B), according to the proportional fairness algorithm, the first subscriber will receive a weight of 1/0 and the second subscriber receives a weight of 100/100. Clearly the first subscriber will receive nearly all of its requested amount, yet there is a limit on how much the air channel can handle, so unused time slots can be allocated to the second flow, resulting in no wasted resources.

Most IP wireline network packet switch equipment vendors use some form of the Generalized Processor Sharing (GPS) approach to schedule packets. Weighted Fair Queuing closely approximates GPS by emulating a bit by bit scheduler but using real variable sized packets. Weighted Fair Queuing (WFQ) assigns each queue a weight factor. The algorithm uses the weight factor to determine a suitable amount of resources to assign to the queue for transmission of packets from the queue through the networks.

WFQ attempts to minimize average system delay. WFQ is denoted by three components:

1. Average Session Delay:

$$D = \left(\sum_{i=1}^{N} d_i\right) / N$$

where:
D=Average System Session or flow delay
$d_i$=delay for a particular flow or session
N=Number of flows or sessions The WFQ algorithm attempts to achieve the minimum Average Systems Session delay with the added constraint of ensuring fairness across all individual flows.

2. Packet Scheduling Algorithm $$\frac{W_i(\tau, t)}{W_j(\tau, t)} >= \frac{\phi_1}{\phi_j}, \, j = 1, \ldots N$$

where:
N=number of active flows
$\phi_1 \ldots, \phi_N$=positive, non zero, natural numbers, representing a relative weight of the overall available bandwidth.
$W_i(\tau, t)$=Bandwidth allocated to a particular flow$_i$ during a time interval($\tau$, t)

This is a significant characteristic of the WFQ algorithm, where each flow will be given a certain share of the overall available bandwidth. In cases where other flows have empty queues, unused bandwidth may be allocated to flows with non empty queues.

3. Guaranteed Minimum Bandwidth Allocation $$r_i = \frac{\phi_1}{\sum_{j=1}^{N} \phi_i} C$$

where:
N=number of active flows
C=Bandwidth Capacity of the egress link

This equation simply states that a particular flow$_i$ will be allocated at least its ratio of the overall available bandwidth on the outgoing egress link.

The techniques discussed herein involve determining a time budget for delivery of each respective packet through the hybrid the wireline—wireless network to the respective wireless subscriber client devices. The time budget for a packet, in the examples, is the maximum allowable latency that the communication application or service can accept without disruption. In some cases, an application at a receiving station (e.g. a VoIP application running on a mobile handset) may discard a packet that is unduly late in arriving at the station, which would essentially set the upper limit on the time budget for the attendant communication to that application running in the client device. For example, a VoIP service or application may have a 150 ms initial budget in several of our VoIP examples. Other services or applications, such as text messaging or software/video downloads will typically have other values for the initial budget.

Sub optimal resource scheduling can occur, as described briefly above, when packets are blindly scheduled based on priority alone. In 3GPP2 cdma2000 1xEV-DO networks, for example, VoIP packets from high priority subscribers and low priority subscribers may be scheduled such that the time delay budgets are exceeded, even when such a problem could have been avoided. FIGS. 4A and 4B illustrate two cases where time delay budgets are exceeded but could have been delivered within the budgets. Again, the queues for the subscriber data packets are shown to the right of the scheduler. Here, subscriber 1 has the low priority traffic, whereas subscriber 2 has the higher priority traffic.

FIG. 4A depicts Case 1, in which high priority packets are scheduled over low priority packets. The following scenario describes how this may occur.

First, consider WFQ (as actually shown in FIG. 4A). Based on the difference in priority, packets for subscriber 1 are transmitted less frequently than those of subscriber 2. As a result, many of the packets intended for subscriber 1 are subject to longer delay times. In wireline networks, this first case is a very likely scenario, where the low priority packets are delayed in the ingress edge, core and final forward link edge. By the time these packets reach the edge between the wireline and wireless parts of the network, the low priority packets are already stale and need to be scheduled immediately for transmission to the target subscriber device. Meanwhile high priority packets are not significantly delayed in the ingress edge, core and final forward link edge, resulting in a large slack time before reaching the timing budget latency limit, say 150 ms for a typical VoIP service application. It makes no noticeable difference to the end user to incur a queuing delay of some minor amount. By reshuffling priorities, and allowing subscriber 1 packets to be scheduled before high priority packets, an optimal allocation of resources could result.

In wireless networks using PF scheduling, this scenario can arise if the channel conditions of the high priority subscriber are very good and the channel conditions of the low priority subscriber are bad, in addition to the situation above where the low priority packets are delayed in the ingress edge, core and final forward link edge. The low priority packets are already stale and need to be scheduled for transmission immediately to the target subscriber. Meanwhile high priority packets are not significantly delayed in the ingress edge, core and final forward link edge, resulting in a large slack time before reaching the 150 ms timing budget latency limit. It makes no noticeable difference to the end user to incur a queuing delay of some minor amount in order to allow the late low priority packets to be scheduled first for transmission to the target client device.

In Case 2 (FIG. 4B), low priority packets are scheduled over high priority packets. Due to the non starvation feature of both algorithms, there may be a case where low priority VoIP packets are scheduled ahead of high priority delayed packets. The following scenario describes how this may occur:

In wireline networks using WFQ scheduling, this second case is a less likely scenario, where the high priority packets are oversubscribed and delayed in the ingress edge, core and final forward link edge. These packets are already stale and need to be scheduled immediately for transmission to the target subscriber. Meanwhile low priority packets are not significantly delayed in the ingress edge, core and final forward link edge, for example, due to taking a different path entirely. The low priority subscriber may actually have packets under the 150 ms timing budget latency limit. It makes little noticeable difference to that end user to incur a queuing delay of some minor amount. Reshuffling priorities, and allowing more of subscriber 2 packets to be scheduled before low priority packets, will result in more chance of all packets arriving within the respective latency budget.

In wireless networks using PF scheduling (as shown in 4B), this second case scenario can arise if the channel conditions of the low priority subscriber are very good and the channel conditions of the high priority subscriber are bad, in addition to the situation above where the high priority packets are delayed in the ingress edge, core and final forward link edge due to oversubscription and a different path from the low priority subscriber traffic. The high priority packets are already stale and need to be scheduled immediately for transmission to the target subscriber (that is to say faster than would be the case if the PF scheduler only based its decision on respective channel conditions as shown). Meanwhile, low priority packets are not significantly delayed in the ingress edge, core and final forward link edge, resulting in a large slack time well within the 150 ms timing budget latency limit. It makes little noticeable difference to the low priority end user to incur a queuing delay of some minor amount in order to allow the late, high priority packets to be scheduled for earlier transmission to the target. The PF scheduler will need to increase the weight of the high priority traffic to allow more packets to arrive within the timing budgets, resulting in a global optimization.

With that overview, it may be helpful to consider the exemplary system illustrated in FIG. 5, in somewhat more detail. FIG. 5 depicts a 3GPP2 1xEV-DO network architecture, overlaid with a distributed integrated packet latency monitor and packet scheduling mechanism. The functional block diagram shows elements of an exemplary wireless mobile communication network 11, for providing packet based services, for multimedia data applications such as mobile voice telephone services based on VoIP type packet communications. The drawing shows network elements in high-level functional block diagram form, and it shows certain aspects of the processing involved in communications through the illustrated elements.

The communication network 11 provides packet communication services for numerous mobile stations, although for discussion purposes, the drawing shows a single device 13. The mobile device 13, sometimes referred to as a mobile User Agent (UA), typically runs one or more 'client' programs for implementing the agent functionality with respect to one or more communication services that the user obtains or subscribes to through the network 11. The mobile device 13, for example, may take the form of a mobile telephone station, with display and user input capabilities to support multimedia communications. Today, such mobile telephones implementations of the device 13 typically take the form portable handsets, although they may be implemented in other form factors. As another class of station examples, the mobile device 13 may take the form of a personal digital assistant (PDA) or a portable personal computer, incorporating a wireless transceiver compatible with the particular type of wireless packet data service offered by the network 11. Of course, the mobile stations may take other forms or connect to a variety of other data devices that may enable use of the network communication services.

The network 11 includes or implements one or more radio access networks (RANs), for wireless communications with the mobile devices receiving service via the network 11. Physical elements of a radio access network include a number of base stations (BSs) 15. Each base station 15 includes an antenna system 17 and a base transceiver system (BTS) 19. One or more routers 21, 23 provide packet routing to and from the BTS 19 and a radio network controller (RNC) 25 at a mobile switching center (MSC) 27.

The base transceiver system (BTS) 19 communicates via the antenna system 17 and the air-link with one or more of the mobile stations 13, when the mobile stations are within range. The BTS 19 is the part of the radio network that sends and receives radio frequency signals carrying packets to/from the mobile stations that the base station 15 currently serves. The BTS communications over the air link with the UA wireless client device 13 provide the High Rate Packet Data Interface (HPRD) for client data services. The BTS 19 includes or is associated with a DOM module that controls the wireless packet communications through the BS and the HPRD wireless domain, including scheduling of packet transmissions on the forward link(s), in this example of the wireless portion of the hybrid network.

The network 11 also includes a number of Packet Data Serving Nodes or "PDSNs." In the MSC 27 serving the mobile device 13, the PDSN 31 serves as a foreign agent (FA). The PDSN is in packet communications with the RNC 25, e.g. via another router 33. The foreign agent PDSN 31 establishes, maintains and terminates logical links to the associated portion of the radio access network. The PDSN also supports point to point protocol (PPP) sessions with the mobile stations 13. The PDSN provides the packet routing function from the radio network to/from other packet switched networks, in this case via the IP network 35 to a home agent (HA) 37, which in turn provides packet routing to/from an IP core network 39, e.g. for Internet or Intranet access.

The agents 31 and 37 are coupled to an Authentication, Authorization, and Accounting (AAA) system 41. At one or more points in the processing of a call or other communication session, the PDSN FA 31 or the HA 37 accesses the AAA server 41 to obtain call access authorization, and the FA and HA provide information regarding the duration/volume of use during the session, to the AAA server for accounting purposes.

From the mobile station perspective, there will often be two or more base stations within range. The mobile device 13 communicates through the BTS 19 of base station 15, selected from among those base stations that it can detect (approximately within range) over the air, ending up with the BTS 15 that provides the best Channel to Interference ratio. The High Rate Packet Data Interface (HPRD) on this wireless segment is the most expensive and narrow capacity network connection amongst all segments (represented thematically by the pipes of various sizes/bandwidths) that will carry the UA's communication. Although shown separately for convenience, the packet scheduler 43 on this segment typically resides in the DOM module implemented in or associated with the BTS 19. Typically, the scheduler is a programmed function of the routing element. The wireless network packet scheduler 43 utilizes a scheduling algorithm, which optimizes system throughput based on a proportional fairness (PF) algorithm.

The next network segment connects the BTS 19 to the Radio Network Controller (RNC) 25, located in the Mobile Switching Center (MSC) 27. Although this IP Backhaul segment could use TDMA circuits, in the example, this wireline segment uses Metro Ethernet connections between routers/switches such as those shown at 21 and 23 to provide transport to and from the MSC 27. Although shown separately for convenience, the RNC 25 implements a packet scheduler 47, typically as a programmed aspect of its packet routing function. On the forward link, the packet scheduler 47 in the RNC 25 typically uses a variant of Weighted Fair Queuing (WFQ). Least latency queuing (LLQ) is a typical implementation, which combines Strict priority queueing with WFQ. The rest of the wireline network segments all use some form of WFQ packet scheduler, as shown by the WFQ scheduler blocks 47 and 49 in the diagram, which may be implemented in routing control software, for example in the PDSN 31 and the home agent 37, respectively. WFQ is designed to minimize average latency for all flows.

The exemplary solution to the problems of sub optimal scheduling policies involves a set of external devices, which generate synchronized time stamps and are aware of the latencies of packets of a particular flow, and which introduce changes based on this information in either one or both of the WFQ and PF packet scheduling decisions. This allows adding notions of slack time and attendant packet reordering, into the packet scheduling algorithms, for Weighted Fair Queuing and/or Proportional Fairness queuing, which in effect compensates or adjusts the incongruencies of the packet scheduling algorithms to optimize the scheduling of packets based on the timing budgets of time critical packets, such as VoIP. The packet latency monitors 51-57 are functionally integrated with the packet scheduling subsystems in the network equipment.

A proposed solution architecture example is shown in FIG. 5, which includes a set of distributed flow based appliances that monitor, record and share packet time stamps and latency information and compute slack times for each packet and feed this information to the packet scheduler(s) for improved packet scheduling decisions. Monitor appliances 51 and 53 comprise appropriate computer hardware coupled to or in communication with the network elements, such as the BTS/DOM at 19, the RNC 25 or to one or more of the associated routers 21, 33. Similar monitor appliances 55 and 59 may be provided for the FA 31 and/or the HA 37. The computer(s) performing the functions of the monitor appliances 51-57 in turn are programmed to provide the monitoring, time stamping, slack computation and associated scheduler control functions discussed herein. Alternatively, other hardware elements in the network, such as the BTS, RNC, FA and HA may be programmed to implement the functions of the appliances internally. For purposes of further discussion, the appliances are referred to as packet latency monitors, shown at 51-57 in the example of FIG. 5.

In the example, the monitors are implemented in each stage or section of the network, to provide data for use in optimizing both WFQ and PF scheduling operations. Those skilled in the art will recognize that it may be possible to implement the slack time adjustments of the scheduling algorithms with respect to a smaller number of schedulers, e.g. only in association with the PF scheduler 43 in the wireless domain and/or only in association with the WFQ scheduler 45 at the edge of the wireline domain.

There are many possible implementations. One possible example involves the tagging of packets with associated globally synchronized timestamps which allow the packet monitor to deduce incremental latencies and remaining timing budget or slack time, which can be used in the reshuffling decision. The packet latency monitors 51-57 can listen on SPAN or port mirror ports of aggregation links on the network routers in the carrier network as well as receive GPS timing synchronization signals for high precision timestamps. If high precision timing is not available, another approach would include monitors that create a hash table based on source and destination IP address, ports, sequence numbers and acknowledgement (ACK) numbers, uniquely identifying each particular point to point flow, watching out for reused ports. The packet latency monitors 51-57 can share this information amongst each other (via data communication links represented by dotted arrows in the drawing). Time budgets are determined by detecting the service or application for each flow, e.g. VoIP which has a 150 MS budget. There is enough information to identify the packet slack time by first identifying the point in time the packet first entered the network. For example, the monitor 57 will generate an initial entry time stamp for each respective packet entering the network via the router element in the HA 37. Downstream monitors can then determine transit time by subtracting entry time from the current time upon arrival at the particular node. The remaining slack time then equals the original time budget minus the transit time.

Typically, the initial slack time or budget at point of entry is a fixed value for a given type of packet communication. For example, a VoIP service or application may have 150 ms initial budget in our VoIP example. The network will typically provide a number of different communication services in support of different applications, such as VoIP voice telephony, text messaging, software downloads, video downloads, web serving, and the like. Different services or applications have different tolerances for network latency. In support, the network may implement different time budgets for packet delivery with regard to subscriber packets relating to those different applications or carried via the different network services. For each service or application, the budget may be fixed in advance. However, the monitors detect the application or service for a subscriber traffic flow, and thus for each respective packet of the flow, from among the services or applications supported through the network. Based on the service or application detected for a particular flow, the monitors assign a time budget for packets in that flow, from among the possible time budgets associated with various different services or applications supported through the network.

As each packet of a flow traverses the network 11, each packet monitor 57 to 51 can compute the remaining slack time by taking the difference between the time the packet entered the network and elapsed time (plus some offset in order to account for the air link) subtracted from the overall time budget. This value can then be fed into the appropriate packet scheduler, e.g. 43 and/or 45, to execute the scheduling policy.

FIGS. 6A and 6B depict two cases that illustrate a problem that may be caused by scheduling and an example of the proposed modified PF algorithm solving that problem, and thus show the benefit of the modification of the PF algorithm based on slack time.

In FIG. 6A, case 1, we see the effect of the current limited packet scheduling mechanisms, where there is no reshuffling of priorities based on slack times. In FIG. 6B, case 2, we see that with reshuffling based on slack times, all packets meet timing budgets, with minimal or no impact on existing users. This reshuffling should occur as close as possible to the target since the exact latencies are not known in intermediate networks, which may result in meeting timing budgets of low priority packets but at the expense of delaying high priority packets since there may have been unexpected high degree of congestion, resulting in a relatively high latency on the high priority path. The examples of FIGS. 6A and 6B perform the reshuffling at the wireless network router performing the PF scheduling, e.g. at the DOM in the BTS 19 in the example of FIG. 5.

On the left side of each of FIGS. 6A and 6B, we see a model of a typical router that supports QoS by offering differentiated services for the ingress network traffic, for example as might be implemented in the FA PDSN 31. For discussion purposes, the router at 31 implements three packet queues for its egress ports, a high priority queue EF, a medium priority queue AF and a low priority queue BE. In reality, differentiated services would have at least 6 queues, each queue corresponding to a particular class, ranging from the expedited forwarding (EF) class, Assured Forwarding (AF1, AF2, AF3, AF4) classes and Best Effort (BE) classes. The diagram only shows 3 classes for simplicity. Similar queues are implemented in the later routers.

Each queue is drained by the packet scheduler of the particular router, in this case, the scheduler 47. A second wireline router is shown, such as one that might be implemented in the RNC 25. The router in 25 implements queues and a scheduler 45, analogous to those of the router in the PDSN 31. The schedulers in the wireline routers (to the left and middle in these drawings), implement the Weighted Fair Queuing (WFQ) algorithm.

At the far right, we see a network routing element for the radio network, which controls the transmission and reception of packets between the mobile and Access Network. In the network of FIG. 5, this would be the router in the DOM module at the BTS 19 (or an associated router 21), although other Access Networks may implement the router and attendant scheduling at other wireless network nodes. Assume for discussion that reordering based on slack time will be implemented in the wireless portion of the network. The key component for purposes of discussing these examples therefore is the Packet Scheduler 43 in the wireless portion of the network, that is to say, the element that implements the Proportional Fairness (PF) Scheduling algorithm, which would be in or otherwise controlling the element implementing the wireless network router transmissions. The router at 19 has the same 3 queues (EF, AF, BE) as the Wireline network elements, and will transmit packets in a similar fashion, although the scheduling of the PF algorithm will tend to chose packets from the queues based on fair allocation of bandwidth and maximizing system throughput.

The network element 43 controlling packet transmissions at node 19 queues-up packets for each mobile device. Then, the element 43 assigns radio resources to the queues of data packets for the mobile devices, based on the relative values given by the PF algorithm. Specifically, the queue for the device having the maximum value produced by the algorithm is given resources to allow transmission of a packet from the queue, the queue for the device with the next highest value is given resources to allow transmission, and so on.

The diagrams illustrate a scenario with 3 flows, where each network hop latency is shown. Each of the $\delta t$ times shown in each of FIGS. 6A and 6B represents the delay incurred by the respective packet as a result of traversing a particular switch/router or a hop across a network cloud to the next routing element. Flow 1, includes packet P1, with an associated latency of 15 ms to traverse the first network cloud, 5 ms switching and queuing latency through each router, and a latency of 5 ms to traverse the second network cloud. For simplicity, we combined switching and queuing latency to 5 ms to all switches, which is cumulative from the top down. The highest priority queue will have only a single 5 ms switching and queuing latency through each router. The second queue (AF) will have 5 ms+5 ms=10 ms switching and queuing latency through each router. Finally the third queue (BE) will have 5 ms+5 ms+5 ms=15 ms switching and queuing latency through each router. Flow 2 containing packet P2 has a latency of 55 ms to traverse the first network cloud and a latency of 25 ms to traverse the second network cloud. Each flow starts and ends up in the same network elements, but may traverse different network paths or incur different transit delay times, due to differing network congestions.

These diagrams will show that in FIG. 6A, we are not meeting timing budgets. This first example shows that there is a total timing budget of 150 ms. This is the maximum time that may elapse for a packet to reach its destination. An example would be the case of voice traffic, where a late IP packet containing encoded voice information is useless unless it reaches its destination within a certain timeframe. The first diagram will show that, without any modifications, we can have a case where some packets will not meet the timing budget, and some packets will be under the timing budget. The second diagram (FIG. 6B) shows that if we apply a simple reshuffling modification to the PF scheduling algorithm, we can achieve an optimal solution, where all packets will reach the destination within their timing budgets. The main idea is to exploit the time where packets are under the timing budget, and offer earlier scheduling to packets in danger of exceeding their timing budget. The following discussion provides more detail.

The basic idea is to compute the slack times of each packet in each queue. Working from the lowest priority queue, up towards the higher priority queues, if there is an opportunity to reinsert a late packet without impacting the existing packets then that packet may be reshuffled, else failed to reshuffle and packet may be discarded early to allow room for other packets which may be able to use the freed up network resources who may now be able to meet their timing budget as a result.

The WFQ schedulers select the EF queue first, then the AF queue and then the BE queue based on the weights given to the different priority traffic. For purposes of the simple example, we will assume that the numbers of packets in the queues and the air link channel conditions tend to cause the PF scheduler to select packets from the queues in a similar order.

In the examples, each of the routers (dotted line rectangles in the drawing) exhibits a 5 ms packet combined scheduling and switching latency. The average latency for the air link is 10 ms. Between the first and second wireline router, the packets from the high priority EF queue experience a 15 ms delay. Between the second wireline router and the router of the wireless domain, the packets from the high priority EF queue experience a 5 ms delay.

The $T_s$ values in the drawings represent slack times detected by the associated monitor appliances (see FIG. 5). In the example, the initial slack times equal the budget(s) for each packet (shown in the left queues), which are all 150 ms, a typical value of permissible latency for VoIP communication. Other applications may dictate different slack time budgets. As shown in the drawing, the $T_s$ values representing the remaining delay budget decrease as each packet traverses the network and is subjected to various delays.

For example, the packet P1 from the high priority queue EF initially has a budgeted slack time $T_s$=150 ms. It incurs a 5 ms delay for combined scheduling and packet switching through the first wireline router at 31/47 and a 15 ms delay in transport over the hop to the second router at 25. As a result, in the EF queue at the second router, that same packet P1 has a remaining slack time $T_s$=130 ms. In turn, the packet P1 incurs another 5 ms delay for scheduling and packet switching through the second wireline router at 25/45 and a 5 ms delay in transport over the hop to the router in the wireless domain at 19. At the time of PF scheduling (at 43) in the wireless network router at 19, packet P1 has a remaining slack time $T_s$=120 ms. Scheduling and switching through that router at 19/43 requires a further 5 ms, and transport over the hop through the wireless link to the subscriber's mobile station involves an additional 10 ms. Of note, the packet P1 arrives well before expiration of the slack time (approximately 105 ms).

The packets in the queue AF having the next highest priority are subject to a combined scheduling/switching delay and transport delays, and those packets are also delayed by the time needed to service the higher priority queue EF. At the first wireline router at location 31, the packet P1 is scheduled and switched through first (5 ms), and the packet P2 from the AF queue is scheduled next. Since the packet P2 from the AF queue incurs a 5 ms scheduling and switching delay, it actually is delayed a total of 10 ms before transmission. In the example, since it uses lower priority facilities subject to more congestion therefore transport of the packet P2 from the AF queue incurs a 55 ms delay over the hop between the two wireline routers.

Assuming that the packet P2 from the queue AF initially has a slack time budget $T_s$=150 ms, when it reaches the second wireline router, that packet has a remaining slack time of 85 ms (150−5−5−55). In turn, the packet P2 incurs a 5 ms delay while a packet is sent from the EF queue, and another 5 ms delay for combined packet scheduling and switching of packet P2 itself through the second wireline router at 25/45. Transport over the hop from the second wireline router at location 19 to the router in the wireless domain takes an additional 25 ms. At the time of PF scheduling in the wireless network router at 43, packet P2 has a remaining slack time $T_s$=50 ms (85−5−5−25). Scheduling for transmission after a packet transmission from the EF queue takes 5 ms, the combined scheduling and switching of packet P2 itself through that wireless domain router requires a further 5 ms, and transport through the wireless link to the appropriate subscriber's mobile station involves an additional 10 ms. Of note, the packet P2 arrives before expiration of the slack time (approximately 30 ms remainder).

Now consider communication of the packet P3 from the lowest priority queue BE. The packets in the queue BE having the next highest priority are subject to switching and transport delays, and those packets are also delayed by the time needed to service the higher priority queues EF and AF.

At the first wireline router at node 31, the packets P1 and P2 are scheduled and switched through first (5 ms+5 ms), and the packet P3 from the BE queue is scheduled next. Since the packet from the BE queue incurs a 5 ms scheduling and switching delay, it actually is delayed a total of 15 ms. In packet P3 from the BE queue incurs a 95 ms delay in transit over the hop between the two wireline routers. Assuming that the packet P3 from the queue BE initially has a slack time budget Ts=150 ms, when it reaches the second wireline router at node 25, that packet has a remaining slack time of 40 ms (150−5−5−95).

In turn, the packet P3 incurs two 5 ms delays (10 ms total) while packets are sent from the EF and AF queues, and another 5 ms delay for packet scheduling and switching through the second wireline router 25/45 (total 15 ms). Transport over the hop from the second wireline router at 25 to the router at node 19 in the wireless domain takes an additional 5 ms, assuming no congestion for this simple example. At the time of PF scheduling in the wireless network router by scheduler 43, the packet P3 has a remaining slack time $T_s=20$ ms (40-5-5-5-5).

In the wireless domain router at node 19, scheduling for transmission after packet transmissions from the EF and AF queues incurs 10 ms delay, and scheduling and switching of packet P3 itself through that wireless domain router requires a further 5 ms. The actual transport through the wireless link to the appropriate subscriber's mobile station involves an additional 10 ms. Hence, delivery of the packet P3 requires a further 25 ms. However, the slack time for P3 is only 20 ms, which means that the network will not be able to deliver the P3 packet to the subscriber station within the timing budget.

It is interesting to note that each of the packets P1 and P2 was well under its respective slack time budget, in the example of FIG. 6A. Packet P1 had an unused slack time of about 105 ms, and packet P2 had an unused slack time of about 30 ms remaining in its timing budget. In FIG. 6B, we have moved packet P3 ahead of packet P2 in the AF queue at the wireless domain router for purposes of PF scheduling, because there is no material impact delivery on packet P1 or packet P2, but there is a significant benefit for packet P3. This is the central idea behind the packet reshuffling technique.

Packet P1 flows through as in the example of FIG. 6A; and packets P2 and P3 flow through the wireline routers to the wireless domain router at node 19, as in that earlier example. At node 19, the packet P2 has a slack time $T_s=50$ ms; and the packet P3 has a slack time $T_s=20$ ms, as in the example of FIG. 6A. Hence, the monitor (e.g. 51 shown in FIG. 5) controls the router and the scheduler 43 to reorder the packets P3 and P2, to facilitate transmission of P3 ahead of P2 and delivery of P3 within its remaining slack time. The reordering could involve an adjustment of the PF scheduling algorithm, e.g. to increase the weight of the 'fairness' algorithm value for the queue containing the packet P3 with the low slack time. If the packets P2 and P3 are already in the same queue, the processing could effectively reorder the packets to place P3 ahead of P2. In the example, the scheduler 43 controls the router to move the packet P3 from the BE queue in the node 19 up to the AF queue in that node and to place the packet P3 ahead of the packet P2 in the AF queue.

Because P3 is placed ahead of P2 in the AF queue in the wireless domain router, the 20 ms remaining on its slack time budget is sufficient to allow the network to deliver that packet before its budget expires. Scheduling to wait while a packet is transported from the EF queue incurs a 5 ms delay. The combined scheduling and switching of the P3 packet itself at 19/43 takes 5 ms. Transport of packet P3 over the air link takes 10 ms.

The packet P2 is delayed, say by an extra 5 ms in the example of FIG. 6B. However, at the time of PF scheduling in the wireless network router at node 19, the packet P2 has a remaining slack time Ts=50 ms. Scheduling for transmission after a packet transmission of P1 from the EF queue takes 5 ms, the delay for transmission of P3 was 5 ms, scheduling and switching through that wireless domain router for packet P2 itself requires a further 5 ms, and transport through the wireless link to the appropriate subscriber's mobile station involves an additional 10 ms. Hence, delivery of packet P2 to the mobile subscriber station requires 25 ms, which is still leaves 25 ms under the slack time budget for that packet.

This second example (FIG. 6B) shows that, by reshuffling, more packets will meet their respective timing budgets than would have otherwise been possible. Packet P2 was been slightly delayed, as a result, but all packets still met their timing budgets.

Figure 7:
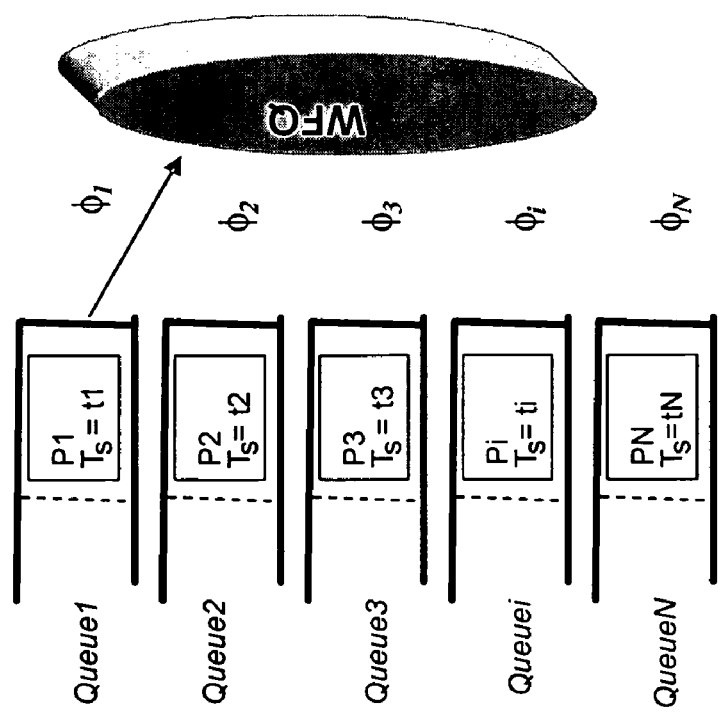
FIG. 7 illustrates a modification to WFQ.

Integrated Packet Latency Aware QoS Scheduling Algorithm Using Weighted Fair Queuing FIG. 7 illustrates a simplified queue model of a typical network router, which describes in more detail, how this reshuffling technique can be applied to the Weighted Fair Queuing, for example, by controlling one or more of the wireline schedulers 45, 47, 49 in response to slack time monitoring by one or more of the appliances 53, 55, 57. On each egress port of the respective router, packets are queued to an appropriate queue, based on each packet's assigned QoS marking, and then scheduled by the WFQ packet scheduler out the egress port. We know, that if the buffer length for each queue is correctly sized, and that if arrival traffic is policed, and there is one flow per queue, then we can state that each flow will receive a certain guaranteed rate of service $\phi_i$, as illustrated below.

Since each queue$_i$ is guaranteed to process packets at a min rate of:

$$r_i = \frac{\phi_1}{\sum_{j=1}^{N} \phi_j} C$$

where:
N=number of active flows
C=Bandwidth Capacity of the egress link
$\phi_1, \ldots, \phi_N$=positive, non zero, natural numbers, representing a relative weight of the overall available bandwidth.
The time to drain a queue$_i$ is:

$$T_i = \frac{NumberofBytes * 8}{r_i}$$

In other words, we compute all the bytes of all packets in a particular queue. This value tells us the total time, it will take to drain a particular queue—entirely.

Now, we must ensure that each current packet in the queue will be serviced within the time the scheduler will be able to service that packet. This can be done in many ways. One way is to assume packets in queues are ordered in increasing slack time. Then we can go packet by packet and make sure that the packet is serviced within the slack time, keeping a running record of the packet with the smallest slack after being serviced. This value is td. Now, we can quickly, approximately determine, whether or not a particular queue is able to accommodate some packet, without exceeding current packets' slack times, within a particular queue, by verifying the processing time of the new packet and td. This is shown visually in FIG. 8 and FIG. 9.

Figure 8:
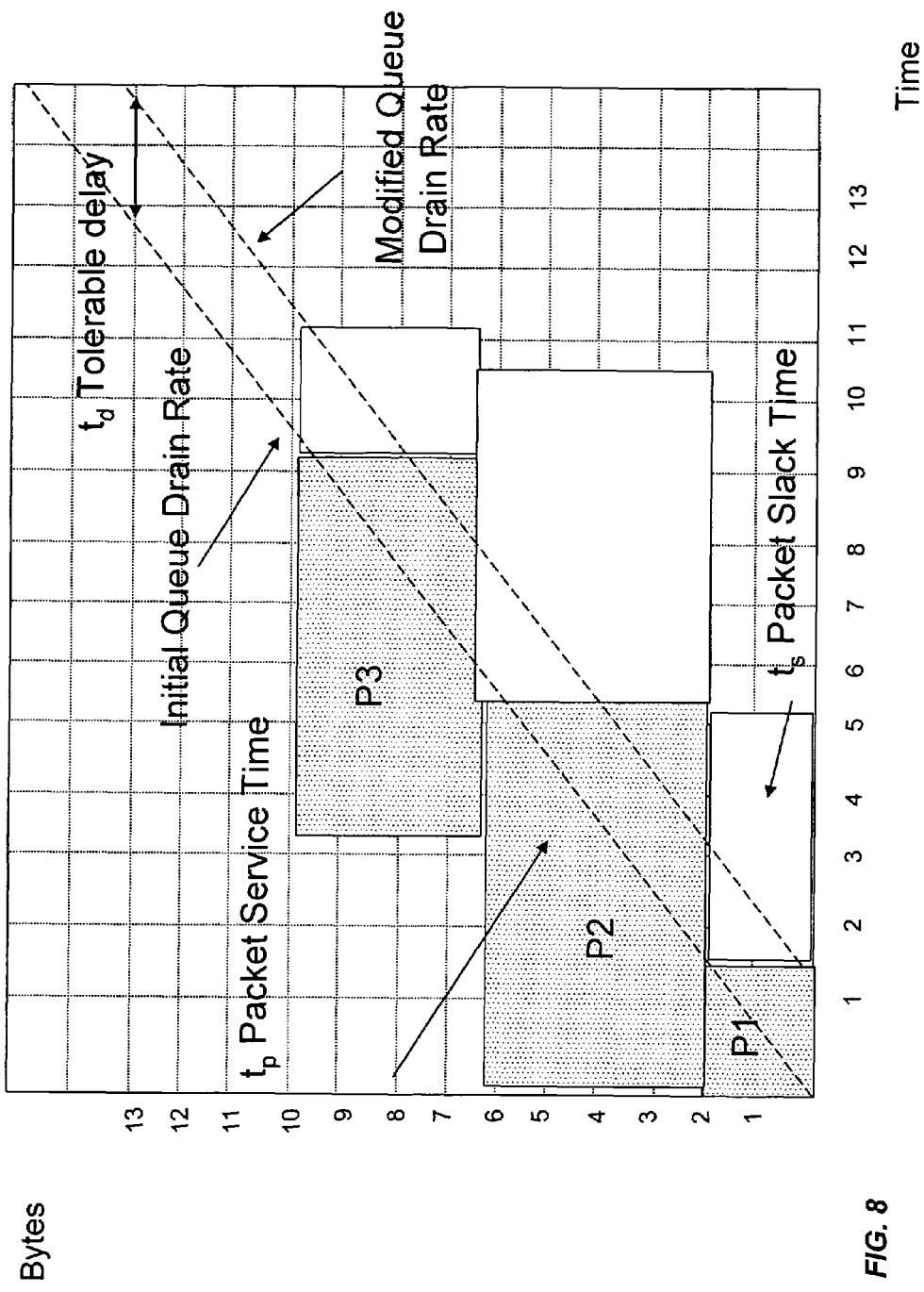
FIG. 8 is a projected visual view of packets in a particular queue and how much delay may be absorbed due to the reshuffling of a possible packet without impacting any other packets already in the queue.
Figure 9:
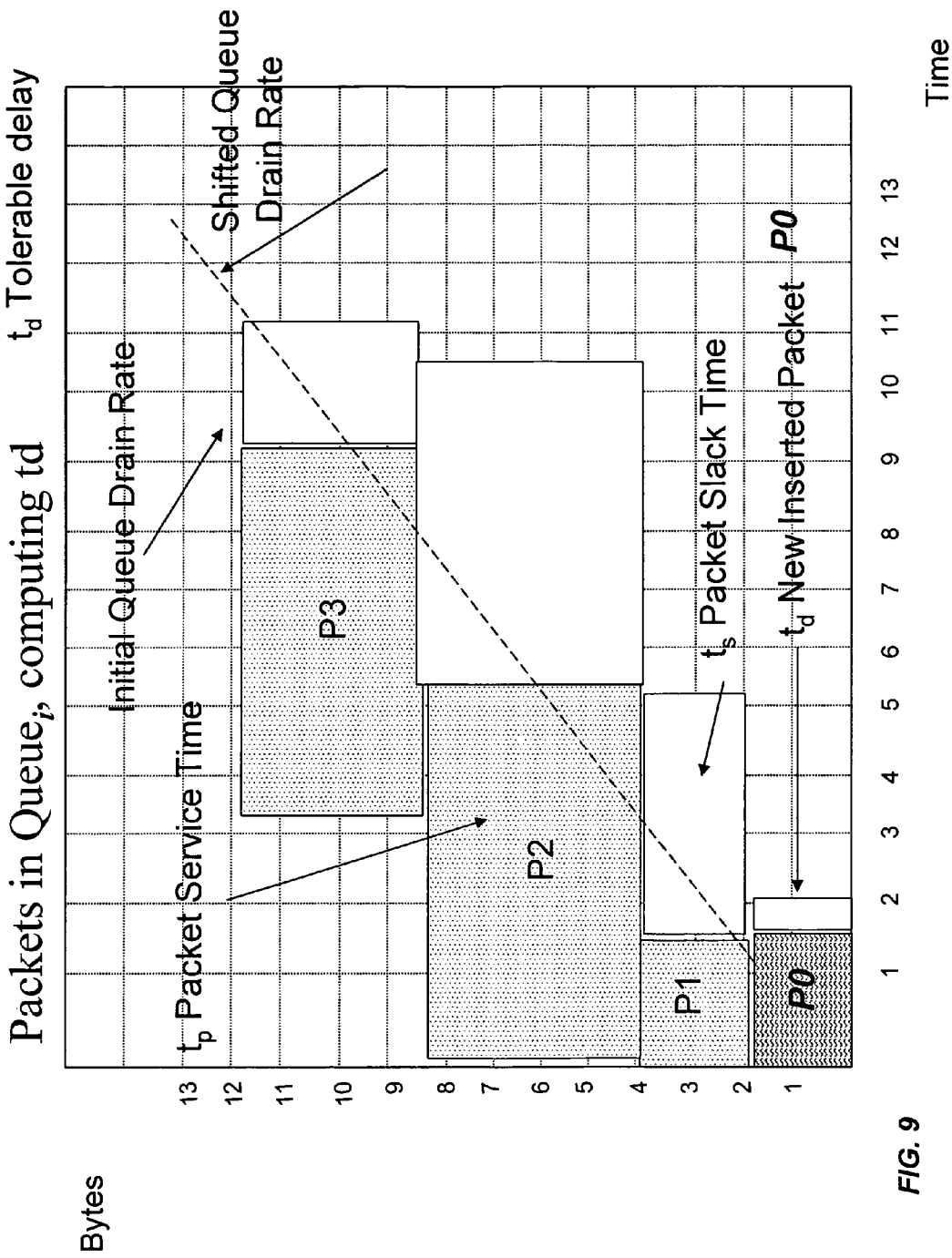
FIG. 9 depicts packets in a particular queue, showing impact on all other packets by inserting a new Packet P0.

FIGS. 8 and 9 represent the effect of shuffling by projecting packets onto a two-dimensional graph with a byte and time axis. The rate at which packets move out of the queue is shown by the derivative or the slope of the dotted line. The dotted line describes the rate, which is the movement of bytes divided by the time interval.

FIG. 8 is a projected visual view of packets in a particular queue and how much delay may be absorbed due to the reshuffling of a possible packet without impacting any other packets already in the queue. The modified queue drain rate is shifted on the time axis by 1 sec and is still able to meet all timing budgets. Notice the tip of packet P3 has all 3 bytes transmitted by its deadline of t=11 secs. All other packets can tolerate further delays and still meet their timing budgets, as shown in the diagram.

In FIG. 8, the graph shows the impact of delaying the scheduling of packets on meeting the timing budgets. The packet rectangle represents the approximate serialization delay to receive and store a packet in a particular queue. The adjacent packet rectangle on the right, represents the amount of slack time that a particular packet may tolerate, and still achieve the timing budget constraint. The dotted 45 degree line represents the rate at which a queue may drain packets. The lower dotted 45 degree line represents the same line, but delayed, the amount of delay is reflected by a horizontal shift of the dotted line to the right, along the time axis. In this figure, we see that we can afford to accommodate a delay, by shifting the drain rate line to the right, and still meet all packet deadlines, up to the point, where the slack time rectangles intersect with the shifted line. In FIG. 8 we see that we can accommodate a delay of 1 sec, which is where packet P3, slack time intersects with the shifted drain rate line.

In FIG. 9, we see the effect of inserting an Packet P0, such that all packets, including the newly inserted packet may all be scheduled and still meet timing budgets. This can be simply stated as, if a newly arriving packet needs to be reshuffled because it has a slack time in danger of being exceeded, then if its processing time is less than td, then it is safe to insert in that queue.

The benefit of this algorithm becomes apparent by looking at a large network device with thousands of queues, e.g. six or more queues per port and many egress ports. Instead of going thru each queue, packet by packet, we can identify immediately which queue is able to accommodate an inserted packet, without exceeding slack times for all other packets in that particular queue.

Integrated Packet Latency Aware QoS Scheduling Algorithm Using Proportional Fair Queuing The Proportional Fairness Queuing algorithm has no deterministic time guarantees that can be inferred for each flow in a particular queue because of the fact that channel conditions change from window to window and hence bandwidth allocations change. From the previous sections, on the final segment on the forward link, we know at this point, what the packets final slack times are and based on that, we can decide which packets are in danger of exceeding timing budgets as well as knowing which packets are of high and low priority. The modification to the PF algorithm can be described as follows:

```
If new arriving packet is in danger of exceeding time budget
    then {
    For each queuei, Start at lowest priority queuei{
        For each packet in queueido{
            If arriving packet can be inserted without exceeding
                other packets slack time then {
                    then insert into queue
                    done
            } else {
                go to next queue
            }
        } /* continue to next queue */
    } /* no queues found */
    drop packet
} /* arriving packet in danger of exceeding time budget */
Else {
    Insert packet in assigned queue
}
```

The modification can be implemented in a variety of methods:
i. throughout the network—this will permit the entire network to make fine tune adjustments as needed to ensure packets meet their timing budgets.
ii. At the Radio Access Network Edge on the forward link path—this will permit the network to make a single adjustment to ensure packets meet their timing budget.

The monitors 51-57 keep track of the packet time stamps needed to determine the packet slack times.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications., modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Acknowledgement (ACK)
Asynchronous Transfer Mode (ATM)
Authentication, Authorization, and Accounting (AAA)
Base Station (BS)
Base Transmitter Station (BTS)
Code Division Multiple Access (CDMA)
Data Optimized Module (DOM)
First Generation Evolution Data Only (1xEV-DO)
Foreign Agent (FA)
Generalized Processor Sharing (GPS)
High Rate Packet Data Interface (HPRD)
Home Agent (HA)
Integrated Multimedia Services (IMS)
Internet Protocol (IP)
Kilo-bits per second (kbs)
Least Latency Queuing (LLQ)
Mega-bits per second (Mbs)
Mobile Switching Center (MSC)
Multi Protocol Label Switching (MPLS)
Packet Control Function (PCF)
Personal Digital Assistant (PDA)
Proportional Fairness (PF)
Quality of Service (QoS)
Radio Access Network (RAN)
Radio Network Controller (RNC)
Third Generation (3G) wireless network
Third Generation Partnership Project 2 (3G PP2)
Time Division Multiple Access (TDMA)
User Agent (UA)
Voice over Internet Protocol (VoIP)
Weighted Fair Queuing (WFQ)

What is claimed is:

1. A method of scheduling packet transmissions, for use in providing packet communication service to wireless subscriber client devices through a hybrid network having a wireline portion and a wireless portion, the method comprising:

determining a time budget for delivery of each respective packet through a combination of the wireline and wireless portions of the network to each of a plurality of the wireless subscriber client devices;

recording a respective time stamp indicating time of entry into the network for each packet;

routing the packets through the wireline portion of the network to the wireless portion of the network, using a first scheduling algorithm;

routing the packets through the wireless portion of the network using a second scheduling algorithm different from the first scheduling algorithm;

with respect to a point in the wireline network or a point in the wireless network before transmission of packets over wireless link to respective wireless subscriber client devices, subtracting a difference between time of arrival of each packet at the point before transmission over wireless link and the time of entry indicated by the respective time stamp, from the time budget for the packet, to compute a slack time representing a remaining amount of the time budget for delivery of each respective packet from said point through the network to one of the wireless subscriber client devices; and at said point, reordering at least two of the packets intended for different wireless subscriber client devices for routing in accord with at least one of the scheduling algorithms, based on the computed slack times for said at least two packets in such a manner as will allow for delivery of the packets intended for different wireless subscriber client devices before expiration of respective timing budgets.

2. The method of claim 1, wherein:
the second scheduling algorithm is a Proportional Fairness (PF) algorithm; and
the reordering reorders said at least two packets for scheduling of transmission over the wireless link in accord with the PF algorithm.

3. The method of claim 1, wherein:
the first scheduling algorithm is a Weighted Fair Queuing (WFQ) algorithm; and
the reordering reorders said at least two packets for scheduling of transmission to the wireless portion of the network in accord the WFQ algorithm.

4. The method of claim 1, wherein:
the first scheduling algorithm is a Weighted Fair Queuing (WFQ) algorithm; and
the second scheduling algorithm is a Proportional Fairness (PF) algorithm.

5. The method of claim 4, wherein:
the reordering reorders said at least two packets for scheduling of transmission to the wireless portion of the network in accord the WFQ algorithm; and
the method further comprises reordering at least two packets intended for different wireless subscriber client devices for routing in accord with the PF algorithm, based on computed slack times.

6. The method of claim 1, further comprising discarding a packet having a slack time too short to allow delivery to an intended destination wireless subscriber client device, so as to advance transmission of another packet.

7. The method of claim 1, wherein the wireless portion of the network is a 3GPP2 1xEV-DO network.

8. The method of claim 1, wherein the determining of the time budget for each respective packet comprises:
determining a communication service or application for the respective packet from among a plurality of services or applications supported through the network; and assigning a time budget associated with the determined service or application from among a plurality of possible time budgets associated with respective services or applications supported through the network.

9. A network for providing wireless service for wireless subscriber client devices, comprising:

a wireline portion, including at least one wireline packet routing element having an associated first packet transmission scheduler function for scheduling transmissions of packets from the wireline packet routing element, the first scheduler function utilizing a first scheduling algorithm;

a wireless portion for receiving packets from the wireline portion and transmitting received packets over one or more air links to the wireless subscriber client devices, the wireless portion including a wireless packet transmission element having an associated second packet scheduler function for scheduling the received packets for transmissions over the one or more air links, the second scheduler function utilizing a second scheduling algorithm different from the first scheduling algorithm; and a packet monitor system for monitoring flows of packets through the network, wherein the packet monitor system:

records a respective time stamp indicating time of entry into the network for each packet;

determines a time budget for delivery of each respective packet through a combination of the wireline and wireless portions of the network to each of a plurality of the wireless subscriber client devices;

with respect to one of the transmission elements, determines a remaining slack time for delivery of each respective packet representing a remaining amount of the time budget for delivery of the packet, by subtracting a difference between time of arrival of each packet at the one transmission element and the time of entry indicated by the respective time stamp, from the time budget for the packet; and instructs the scheduler function associated with the one transmission element to reorder at least two of the packets intended for routing through the one transmission element and delivery to different wireless subscriber client devices, to avoid an expiration of the slack time for delivery of one of the at least two packets, based on the computed slack times for said at least two packets.

10. The network of claim 9, wherein:
the second scheduling algorithm is a Proportional Fairness (PF) algorithm; and
the packet monitor instructs the second scheduler function to reorder packets to avoid an expiration of the slack time for delivery of one of the packets.

11. The network of claim 9, wherein:
the first scheduling algorithm is a Weighted Fair Queuing (WFQ) algorithm; and
the packet monitor instructs the first scheduler function to reorder packets to avoid an expiration of the slack time for delivery of one of the packets.

12. The network of claim 9, wherein:
the first scheduling algorithm is a Weighted Fair Queuing (WFQ) algorithm; and
the second scheduling algorithm is a Proportional Fairness (PF) algorithm.

13. The network of claim 9, wherein the wireless portion of the network comprises a 3GPP2 1xEV-DO network.

14. The network of claim 13, wherein:
the wireless portion comprises a Base Transmitter Station (BTS); and
the at least one packet transmission element comprises a Data Optimized Module (DOM) in the BTS.

15. The network of claim 14, wherein:
a radio network controller (RNC) interfaces the wireline portion to the wireless portion; and
the at least one packet routing element is implemented in or associated with the RNC.

16. The network of claim 9, wherein the packet monitor system comprises:
a first monitor appliance associated with the wireline packet routing element; and
a second monitor appliance associated with the wireless packet transmission element.

17. The network of claim 16, wherein:
the first monitor appliance generates the time stamp for each respective packet flowing through the wireline packet routing element, indicating time of entry into the network for the respective packet; and
the second monitor appliance computes the remaining slack time for each respective packet upon arrival of the respective packet at the wireless packet transmission element.

18. A method of scheduling packet transmissions, for use in providing packet communication service to wireless subscriber client devices through a hybrid network having a wireline portion and a wireless portion, the method comprising:
determining a time budget for delivery of each respective packet through a combination of the wireline and wireless portions of the network to each of a plurality of the wireless subscriber client devices, by:
determining a communication service or application for the respective packet from among a plurality of services or applications supported through the network; and
assigning a time budget associated with the determined service or application from among a plurality of possible time budgets associated with respective services or applications supported through the network as the time budget for delivery of the respective packet through network;
routing the packets through the wireline portion of the network to the wireless portion of the network, using a first scheduling algorithm;
routing the packets through the wireless portion of the network using a second scheduling algorithm different from the first scheduling algorithm; and
at a point in the wireline network or a point in the wireless network before transmission of packets over wireless link to respective wireless subscriber client devices:
computing a slack time representing a remaining amount of the time budget for delivery of each respective packet; and
reordering at least two of the packets intended for different wireless subscriber client devices for routing in accord with at least one of the scheduling algorithms, based on the computed slack times for said at least two packets in such a manner as will allow for delivery of the packets intended for different wireless subscriber client devices before expiration of respective timing budgets.

* * * * *